United States Patent Office 3,135,809
Patented June 2, 1964

3,135,809
ISOMERIZATION PROCESS
George Bosmajian, Birmingham, Ala., assignor to Southern Research Institute, Birmingham, Ala., a corporation of Alabama
No Drawing. Filed July 21, 1960, Ser. No. 44,247
17 Claims. (Cl. 260—650)

This invention is concerned with an improved process for isomerizing substituted hydrocarbons, and particularly polyalkyl substituted benzenes with the aid of a new type of isomerization catalyst. In brief, the process comprises the use of an isomerization catalyst derived from compounds of the transition metals in conjunction with compounds of the non-transition metals.

The reaction to which the improved process is applicable, is that in which there is a rearrangement of the position of the alkyl substituents on the benzene nucleus, for example, the conversion of para-xylene (1,4-dimethylbenzene) into meta-xylene (1,3-dimethylbenzene). In this specification, such a rearrangement is called an isomerization reaction.

Also, the novel isomerization catalyst system disclosed herein has been found to be of value as a catalyst system to effect the alkylation of aromatic hydrocarbons.

Numerous workers have in the past attempted to find a suitable means whereby the isomerization of polyalkyl substituted benzenes may be conveniently effected. In such an isomerization process, there are several difficulties which must be overcome in order to achieve a desirable result. The majority of the prior art processes require the use of high temperatures in order to supply the energy requirements necessary to effect the isomerization and to effect the process at speeds necessary for commercial acceptability. The use of high temperatures has the disadvantage that there is considerable cracking and disproportionation occurring and the yields are low. "Disproportionation" as used herein with regard to polyalkyl benzenes means the transfer of alkyl groups from one benzene ring to another, such as xylene being disproportionated to toluene and trimethyl benzenes. A variety of different processes have been proposed to effect the isomerization of polyalkyl substituted benzenes; these include a thermal process, which employs no catalyst, and several processes employing a variety of catalyst systems, such as, aluminum chloride, either singularly or in combination with a promotor, such as hydrogen chloride; various natural or synthetic silica or silica-alumina materials, used either untreated or treated with various metal oxides; and hydrogen fluoride or a mixture of hydrogen fluoride and boron trifluoride.

It has now been found that the isomerization of polyalkyl substituted benzenes may be effectively and efficiently achieved with the aid of a new type of catalyst system for this isomerization reaction. The new type of catalyst sytem within the scope of this invention comprises those catalysts which have recently gained wide prominence and acceptance in the field of polymerization reactions, the Ziegler-type catalysts. The term "Ziegler-type catalyst" as used here and in the appended claims is used with the broad definition as given by Gaylord and Mark ["Linear and Stereoregular Addition Polymers," Interscience Pub. Inc. (1959), particularly pages 90–106, 491, and 492]. A brief illustrative definition given by Gaylord et al. is: "The Ziegler-type catalysts are the result of the reaction of two different species of metal compounds; (a) compounds of groups IV–VIII transition elements, hereinafter called the catalyst, and (b) compounds such as metal hydrides and alkyls capable of giving rise to hydride ions or carbanions, hereinafter called the cocatalyst."

More specifically, the more suitable compounds of the transition elements, effective as a catalyst in a Ziegler-type catalyst system, are those selected from the group consisting of halides, oxyhalides, chelates of beta-ketones and alcoholates of the transition metals. Compounds most suitable as a cocatalyst in a Ziegler-type catalyst system, are those compounds of the non-transition metals selected from the group consisting of organometallic, organometallic halide, metal hydride, complex metallic hydrides and complex organometallic hydrides. Other transition metal compounds such as the oxides, complex halides, and organic acid salts are useful, as are other non-transition metal compounds.

Also, it has been found that a catalyst system comprising a titanium trihalide is highly effective in isomerizing polyalkyl substituted benzenes, under conditions similar to those used with the Ziegler-type catalyst system. The operable trihalide compound is a member selected from the group consisting of titanium trifluoride, titanium trichloride, titanium tribromide and titanium triiodide.

Since the alkylation of aromatic hydrocarbons proceeds by the same type of mechanism as the isomerization process, the catalyst system described herein may also be used to effect the alkylation of aromatic hydrocarbons. Thus, for example, the treatment of benzene with ethyl bromide in the presence of a Ziegler-type catalyst will result in the formation of substantial quantities of ethyl benzene.

In the isomerization process of this invention the polyalkyl substituted benzene or the mixture of polyalkyl substituted benzenes to be isomerized is brought into contact with the characteristic interaction product of the components of the Ziegler-type catalyst system, which has previously been prepared according to standard methods well known in the art. This contact is maintained for the necessary length of time and at a suitable temperature to effect the degree of isomerization desired. The isomerization process is effected under substantially anhydrous conditions and suitably in the presence of an inert atmosphere, such as nitrogen gas, so as to avoid extensive decomposition of the catalyst system. After the reaction has proceeded for the selected reaction time, the catalyst system is decomposed with a suitable decomposing agent, such as methanol, and the products of the process are recovered by suitable means.

A clearer understanding of the process of this invention may be obtained from the examples given below, which disclose the best modes, presently contemplated by the inventor, of carrying out this invention.

EXAMPLES 1–21

The following general procedure was used with various Ziegler-type catalysts in isomerizing various polyalkyl substituted benzenes. Ten grams of the polyalkyl substituted benzene was placed in a Parr bomb of 45 ml. capacity, the bomb was flushed with dry nitrogen and 0.8 gram of the catalyst system was added. The catalyst system had previously been prepared as described below. The bomb was sealed, placed in a rocking autoclave, heated to the desired reaction temperature, and maintained at this temperature for the specified reaction time. At the end of the time, the bomb was cooled, opened and methanol added to decompose the catalyst. The reaction product was recovered from the methanol, dried over anhydrous magnesium sulfate, filtered and a portion analyzed by gas chromatography to ascertain the isomer ratio. The results of these examples are given in Table I.

Table I

| Example No. | Initial material | Catalyst system | Temp. (°C) | Time (hours) | Products [1] Percent Ortho- | Percent Meta- | Percent Para- | Percent disproportionation [2] |
|---|---|---|---|---|---|---|---|---|
| 1 | o-Xylene | Al(C₂H₅)₃:TiCl₄ 1:1 ratio | 250 | 3 | 76.5 | 23.5 | 23.5 | Trace |
| 2 | m-Xylene | Al(C₂H₅)₃:TiCl₄ 1:1 ratio | 180 | 3 | 17 | 67 | 16 | 6 |
| 3 | do | Al(C₂H₅)₃:TiCl₄ 1:1 ratio | 250 | 16 | 33 | 56 | 11 | 13 |
| 4 | p-Xylene | Al(C₂H₅)₃:TiCl₄ 1:1 ratio | 250 | 3 | 3.4 | 96.6 | 96.6 | 5 |
| 5 | do | Al(C₂H₅)₃:TiCl₄ 1:1 ratio | 250 | 69 | 4 | 43 | 53 | 13 |
| 6 | o-Xylene | Al(C₂H₅)₃:TiCl₄ 1:4 ratio | 250 | 3 | 88 | 11 | 1 | 0 |
| 7 | do | Al(C₂H₅)₃:TiCl₄ 1:4 ratio | 250 | 24 | 40 | 52 | 8 | 6 |
| 8 | do | Al(C₂H₅)₃:TiCl₄ 1:4 ratio | 250 | 48 | 24 | 54 | 22 | 19 |
| 9 | m-Xylene | Al(C₂H₅)₃:TiCl₄ 1:4 ratio | 200 | 3 | 15.9 | 84.1 | 84.1 | 3 |
| 10 | do | Al(C₂H₅)₃:TiCl₄ 1:4 ratio | 250 | 24 | 25 | 59 | 16 | 9 |
| 11 | p-Xylene | Al(C₂H₅)₃:TiCl₄ 1:4 ratio | 250 | 3 | 7 | 51 | 42 | 13 |
| 12 | do | Al(C₂H₅)₃:TiCl₄ 1:4 ratio | 250 | 24 | 8 | 54 | 38 | 16 |
| 13 | o-Xylene | Al(C₂H₅)₃:VOCl₃ 1:1 ratio | 250 | 24 | 85 | 15 | 0 | 1 |
| 14 | m-Xylene | Al(C₂H₅)₃:VOCl₃ 1:1 ratio | 250 | 24 | 13 | 87 | 0 | 2 |
| 15 | o-Xylene | Al(C₂H₅)₂Cl:TiCl₃ 1:1 ratio | 250 | 24 | 97 | 1.5 | 1.5 | 0 |
| 16 | m-Xylne | Al(C₂H₅)₃:FeCl₃ | 250 | 16 | 3.4 | 96.6 | 96.6 | 0 |
| 17 | o-Xylene | TiCl₃ | 250 | 16 | 6.7 | 32 | 1 | 2.1 |
| 18 | m-Xylene | TiCl₃ | 250 | 16 | 7 | 90 | 3 | 10 |
| 19 | o-Xylene | TiCl₃ | 250 | 16 | 5 | 27 | 68 | 7 |
| 20 | p-Xylene | Al(C₂H₅)₃:TiCl₄ 4:1 ratio | 250 | 3 | 93.0 | 7.0 | 7.0 | 0 |
| 21 | m-Xylene | Al(C₂H₅)₃:TiCl₄ 1:8 ratio | 250 | 3 | 3.8 | 96.2 | 96.2 | 0 |

[1] Percentages are precent by weight and are based upon the xylene fraction only.
[2] Percentages are percent by weight and are based upon the total product.

In the above examples only one specific method of effecting the reaction has been described in detail. However, it is obvious that many modifications of this method may be made, as for instance, the use of a suitable non-reactive solvent, a continuous process rather than a batch process, the use of isomeric mixtures of the various polyalkyl substituted benzenes rather than only one isomer, the use of impure starting material rather than pure material, with the qualification that the impurities are non-destructive to the catalyst system to any great extent, and other modifications. Usually one of several isomers is more stable than others of the same compound, and this is important in using the invention with certain isomers and certain catalysts.

The concentration of the catalyst system which can be used varies over a wide range, thus percentages from about 0.1% up to about 50% can be used. These percentages are expressed as percentages by weight based upon the total weight of reacting material. The preferred percentage of the catalyst system is in the range of from about 1% to about 25%. The reaction temperature can be varied over a wide range, from about 50° C. to about 500° C. As indicated by the above examples, higher temperatures promote more disproportionations, while at lower temperatures the speed of the reaction is slow. The preferred reaction temperature range is from about 150° C. to about 300° C. The effectiveness of the catalyst, the material being isomerized, and the temperature are factors affecting the time which is required. Although longer or shorter times are useful, a preferred range for carrying out the isomerization is from about 5 minutes to about 6 hours. Particularly at higher temperatures it is desirable to use superatmospheric pressures; thus the pressure suitably is within the range of from atmospheric to 1000 p.s.i.a. or more.

Useful solvents or suspending agents for the catalyst are non-polar organic liquids such as the hydrocarbons, including materials such as benzene, pentane, hexane, petroleum naphthas, and similar materials such as halogenated aliphatic hydrocarbons. It is preferred to use as solvent the material which is being isomerized, or if desired, to use a material which is readily separable therefrom by fractional distillation.

Impurities reactive with the catalyst or which may inhibit the reaction, such as oxygen, water, olefins, phenols, ethers, amines, or alcohols, should be present in no more than very small amounts, if at all. Thus the reaction mixture should consist essentially of the catalyst, the material being isomerized, and solvent, if used.

The preparation of the catalyst system may be effected by any of the means commonly used in the art to prepare these catalysts. One such method is to mix, in an inert dry atmosphere, a solution of the transition metal compound in a non-reactive solvent, such as a mixture of low-boiling aliphatic hydrocarbons, with a solution of the non-transition metal compound in a similar solvent. The rate of mixing is controlled so as to avoid an excessive temperature of the reaction mixture due to the exothermic nature of the reaction. The precipitate formed by the interaction of the transition metal compound and the non-transition metal compound is then employed as the catalyst system. The catalyst system may be prepared in the reactor in a manner similar to that described above and the material to be isomerized then added to the reactor.

As indicated by the above example, there is some importance attached to the ratio of transition metal compound to non-transition metal compound used to prepare the catalyst system. Thus, with mole ratios of 1:1 and 1:4 parts of triethyl aluminum to titanium tetrachloride better results were obtained as an isomerization catalyst than when mole ratios of 4:1 and 1:8 of triethyl aluminum to titanium tetrachloride were used. Similar differences in catalytic activity are to be expected using any of the Ziegler-type catalyst systems.

The term polyalkyl benzenes as used here and in the appended claims is used to define compounds corresponding to the following general formula $C_6H_aR_b$, wherein R represents a member selected from the group consisting of (lower) alkyl and (lower) alkenyl; "$a$" and "$b$" are integers, the sum of which is equal to six; and "$b$" is an integer having a value of either two, three or four. The (lower) alkyl and (lower) alkenyl groups or radicals which are represented by R above include radicals having up to about 5 carbon atoms in either a branched or a straight chain. Examples of suitable polyalkylbenzenes which may be isomerized with the aid of catalysts of this invention include the dimethylbenzenes, diethylbenzenes, diisopropylbenzenes, divinylbenzenes, dibutylbenzenes, trimethylbenzenes, tri-n-propylbenzenes, dimethylvinyl benzenes, tetraethylbenzene and the like. Polymerizable monomers may require the presence of polymerization inhibitors, but since these are commonly phenolic or amino compounds, they should be used only in small amounts, such as 0.1–0.5% by weight of the reaction mixture.

The term polyhalogen substituted benzenes as used here and in the appended claims is used to define compounds corresponding to the following general formula $C_6H_aX_b$, wherein X represents a member selected from the group consisting of fluorine, chlorine, bromine and iodine; "a" and "b" are integers, the sum of which is equal to six; and "b" is an integer having a value of either two, three or four. Examples of suitable polyhalogen benzenes which may be isomerized with the aid of the catalyst system include the trichlorobenzenes, dibromobenzenes, diiodobenzenes, difluorobenzenes, tetrachloroabenzenes and the like.

The term polyhalogen alkyl substituted benzenes as used here and in the appended claims is used to define compounds corresponding to the following general formula $C_6H_aR_bX_c$, wherein R and X have the standard meanings as set forth above; "a," "b" and "c" are integers, the sum of which is equal to six; "b" and "c" are integers having the values of either one or two. Examples of suitable polyhalogen alkyl benzenes which may be isomerized with the aid of the catalyst system of this invention include the iodotoluens, chloroxylenes, dibromotoluenes, fluorotoluenes and the like.

The term polyaryl substituted benzenes as used here and in the appended claims is used to define compounds coresponding to the general formula $C_6H_aA_b$, wherein A represents a member selected from the group consisting of phenyl and substituted phenyl; "a" and "b" are integers, the sum of which is equal to six, and "b" is an integer having a value of either two or three. Examples of suitable polyaryl substituted benzenes which may be isomerized with the aid of the catalyst system of this invention include the ditolylbenzenes, triphenylbenzenes, dichlorophenylbenzenes and the like.

The term alkyl substituted naphthalenes as used here and in the appended claims is used to define compounds wherein a (lower) alkyl group is substituted in either the alpha or beta position of a naphthalene molecular. The term (lower) alkyl is used to define radicals having up to about 5 carbon atoms in either a branched or straight chain. Examples of suitable alkyl substituted naphthalenes which may be isomerized with the aid of the catalyst system of this invention include the methyl naphtholenes, isopropylnaphthalenes and the like.

The term transition metal is used here and in the appended claims as defining elements of groups IVB, VB, VIB, VIIB, and VIII of the periodic table of elements. The preferred elements are as follows: titanium, zirconium, hafnium, vanadium, columbium, tantalum, chromium, molybdenum, tungsten, manganese, technetium, rhenium, iron, cobalt, nickel, ruthenium, rhodium, palladium, osmium, iridium and platinum.

The term non-transition metal is used here and in the appended claims as defining the metallic elements of Group IA, II, IIIA and IVA of the periodic table of elements. The preferred elements are as follows: lithium, sodium, potassium, rubidium, cesium, beryllium, magnesium, calcium, strontium, barium, aluminum, gallium, indium, thallium, germanium, lead, tin, zinc and cadmium.

The transition metal halide component of the catalyst system comprises the halides of these elements, as defined above, in their stable oxidation states between the oxidation numbers of two and eight. The halides of the aforementioned transition metals, which are useful as a component of the catalyst system, include the fluorides, chlorides, bromides, and iodides. Examples of the transition metal halides which can be used include titanium tetrachloride, zirconium tetraiodide, tungsten hexachloride, vanadium tetrachloride, ferric fluoride, molybdenum pentachloride, cobaltic iodide, titanium trichloride, chromium trichloride, and the like.

The transition metal oxyhalide component of the catalyst system comprises the oxyhalides of these elements, as defined above, in their stable oxidation states between the oxidation numbers of two and eight, which form stable oxyhalides. These oxyhalides include the oxyfluorides oxychlorides, oxybromides and oxyiodides. Examples of the transition metal oxyhalides which can be used are vanadium oxychloride, titanium oxyfluoride, zirconium oxyiodide, oxmium oxychloride, chromium oxybromide, and the like.

The transition metal alcoholate useful as a component of the catalyst system comprises the alcoholates of these elements, as defined above, in their stable oxidation states between the oxidation numbers of two and eight, which form stable alcoholates. The term alcoholate is used here as defining a compound of a transition metal wherein there is at least one alkoxy group bonded to the metal atom. The term alkoxy is used in its standard meanings, in that it is a group or radical of the formula, —O—R, wherein R is an alkyl or substituted alkyl group having from 1 to about 10 carbon atoms either branched or straight chain. Examples of the transition metal alcoholates which can be used include monochlorodiethyl zirconate, tetrisopropyl titanate, tripropyl vanadate, dichlorodiethyl titanate, and the like.

The transition metal chelate compound of beta-ketone useful as a component of the catalyst system comprises the beta-ketone chelates of these elements, as defined above, in their stable oxidation states between the oxidation numbers of two and eight, which form stable chelates with beta-ketones. The beta-ketones which can be used are those having a structure:

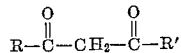

wherein R is an alkyl, cycloalkyl, aryl or a substituted derivative thereof, and R' is a hydrogen or an alkyl, cycloalkyl, aryl or substituted derivative thereof. When R' is a hydrocarbon radical, it may be the same as, or different than R. R may, for example, be a methyl, ethyl, propyl, isopropyl, butyl, cyclohexyl, methylcyclohexyl, phenyl, or tolyl radical, and R' may be the same as R or a different radical such as described for R. The preferred beta-ketone is acetylacetone. Examples of useful beta-ketone chelates, are chromium acetylacetonate, zirconium acetylacetonate, vanadium acetylacetonate, iron acetylacetonate and the like. Similarly, the corresponding chelates of 1,3-hexanedione, 3,5-nonanedione and the like may be used.

The non-transition metal, organometallic component of the catalyst system comprises the organometallic compounds corresponding to the formula $R_aM$, wherein M is the non-transition metal as defined above, "a" is an integer equal to the valence of the metal and R represents a member selected from the group consisting of alkyl, cycloalkyl, aryl, arylalkyl and substituted derivatives thereof. The alkyl, cycloalkyl, aryl, and arylalkyl radicals which are represented by R above include radicals having up to about 20 carbon atoms, although radicals having about 10 carbon atoms are preferred. Examples of suitable organometallic compounds of the non-transition metals, include, butyl lithium, phenyl sodium, allyl sodium, diethyl zinc, benzl, potassium, diethylphenyl aluminum, tetrabutyl tin, diphenyl cadmium, tri-n-octyl aluminum and the like.

The non-transition metal, organometallic halide component of the catalyst system comprises the organometallic halide compounds corresponding to the formula $R_aMX_b$ wherein M is a non-transition metal, as defined above, with a valence greater than 1, $a$ and $b$ are integers and the sum of $a$ and $b$ is equal to the valence of the metal M, X represents a halogen selected from the group consisting of fluorine, chlorine, bromine, and iodine and R represents a member selected from the group consisting of alkyl, cycloalkyl, aryl, arylalkyl and substituted derivatives thereof. The alkyl, cycloalkyl, aryl, and arylalkyl radicals which are represented by R above include radicals having up to about 20 carbon atoms, although radicals having 10 carbon atoms or less are preferred. Examples of suitable organometallic halide compounds of the non-transition metals, include, diethyl aluminum chloride, octyl aluminum diiodide, dicyclohexyl gallium chloride, di(3-phenyl-1-methylpropyl) indium fluoride, propyl magnesium chloride, phenyl magnesium bromide and the like.

The non-transition metal, metal hydride component of the catalyst system comprises the metal hydrides corresponding to the formula $MH_a$, wherein M is a non-transition metal, as defined above, and "$a$" is an integer equal to the valence of the metal. Examples of suitable metal hydrides include, sodium hydride, aluminum hydride, lithium hydride, calcium hydride, gallium hydride, magnesium hydride, and the like.

The non-transition metal, complex metal hydride component of the catalyst system comprises the complex metal hydrides corresponding to the formula $M_1M_2H_a$ wherein $M_1$ represents a member selected from the group consisting of lithium, sodium, potassium, rubidium, cesium, beryllium, magnesium, calcium, strontium and barium; $M_2$ represents a member selected from the group consisting of aluminum, gallium, indium and thallium; and "$a$" is an integer equal to the sum of the valence of the two metals. Examples of suitable complex metal hydrides include lithium aluminum hydride, lithium indium hydride, calcium aluminum hydride, cesium aluminum hydride, lithium gallium hydride, barium aluminum hydride and the like.

The non-transition metal, complex organometallic hydride component of the catalyst system comprises the complex organometallic hydride corresponding to the formula $M_1M_2H_aR_b$, wherein $M_1$ represents a member selected from the group consisting of lithium, sodium, potassium, rubidium, cesium, beryllium, magnesium, calcium, strontium and barium; $M_2$ represents a member selected from the group consisting of aluminum, gallium, indium and thallium; "$a$" and "$b$" are numbers, the sum of which is equal to the sum of the valences of the metals and "$b$" is an integer having a value of from one up to and including the sum of the valences of the two metals; R represents a member selected from the group consisting of alkyl, cycloalkyl, aryl, arylalkyl and substituted derivatives thereof. The alkyl, cycloalkyl, aryl and arylalkyl radicals which are represented by R above include radicals having up to about 20 carbon atoms, although radicals having about 10 carbon atoms are preferred. Examples of suitable complex organometallic hydrides include, lithium aluminum tetradecyl, sodium aluminum tetradodecyl, magnesium aluminum tetraethyl, potassium aluminum tetracyclohexyl, sodium aluminum tributyl hydride, lithium aluminum tetra(4-vinylcyclohexane), calcium aluminum diethyl hydride, potassium gallium diethyl hydride, sodium indium ethyl hydride and the like.

In some cases known isomerization catalysts may be added to the Ziegler-type catalyst. Thus equal amounts of certain Friedel-Crafts catalysts such as aluminum chloride and the Ziegler-type catalyst provide an operable catalyst mixture. Similarly, mixtures of different Ziegler-type catalysts are useful.

Alkyl substituted non-aromatic hydrocarbons such as the dimethylhexanes, dimethylcyclohexanes, isopentane, and similarly alkyl substituted open chain and cyclic hydrocarbons are useful in place of the polyalkyl substituted benzenes as starting materials.

In this specification, "integer" is used to denote a whole number of 1 or greater, and "number" has the same meaning but includes zero. Also, wherever the catalyst system is specified as containing or comprising the transition metal compound and the non-transition element compound, it is intended to include interaction products of these compounds, if any.

I claim:

1. A process of isomerizing a member selected from the group consisting of a polyalkyl substituted benzene, a polyhalogen substituted benzene, a polyhalogenalkyl substituted benzene, a polyaryl substituted benzene and an alkyl substituted naphthalene, the improvement of effecting said isomerization in a reaction mixture consisting essentially of an antecedently formed catalyst system comprising the interaction product of (1) a transition metal compound selected from the group consisting of halides, oxyhalides, chelates of beta-ketones, and alcoholates of said transition metal and (2) a non-transition metal compound selected from the group consisting of organometallic, organometallic halide, metal hydride, complex metallic hydrides and complex organometallic hydrides of said non-transition metals and the isomerizable material, said isomerization step being sequentially followed by the steps of decomposing the catalyst system and recovering the isomerized hydrocarbon.

2. In a process of isomerizing a polyalkyl substituted benzene, the improvement of effecting said isomerization in a reaction mixture consisting essentially of an antecedently formed catalyst system comprising the interaction product of (1) a transition metal compound selected from the group consisting of halides, oxyhalides, chelates of beta-ketones, and alcoholates of said transition metal and (2) a non-transition metal compound selected from the group consisting of organometallic, organometallic halide, metal hydride, complex metallic hydrides and complex organometallic hydrides of said non-transition metals, and the isomerizable material, said isomerization step being sequentially followed by the steps of decomposing the catalyst system and recovering the isomerized hydrocarbon.

3. The process of claim 2 wherein the polyalkyl substituted benzene is a dialkyl substituted benzene.

4. The process of claim 2 wherein the polyalkyl substituted benzene is a dimethyl substituted benzene.

5. In a process of isomerizing a member selected from the group consisting of a polyalkyl substituted benzene, a polyhalogen substituted benzene, a polyhalogenalkyl substituted benzene, a polyaryl substituted benzene and an alkyl substituted naphthalene, the improvement of effecting said isomerization in a reaction mixture consisting essentially of an antecedently formed catalyst system comprising the interaction product of (1) a transition metal oxyhalide and (2) an organometallic compound of a non-transition metal and the isomerizable material, said isomerization step being sequentially followed by the steps of decomposing the catalyst system and recovering the isomerized hydrocarbon.

6. In a process of isomerizing a polyalkyl substituted benzene, the improvement of effecting said isomerization in a reaction mixture consisting essentially of an antecedently formed catalyst system comprising the interaction product of (1) a transition metal oxyhalide and (2) an organometallic compound of a non-transition metal and the isomerizable material, said isomerization step being sequentially followed by the steps of decomposing the catalyst system and recovering the isomerized hydrocarbon.

7. The process of claim 6 wherein the polyalkyl substituted benzene is a dimethyl substituted benzene.

8. In a process of isomerizing a member selected from the group consisting of a polyalkyl substituted benzene, a polyhalogen substituted benzene, a polyhalogenalkyl substituted benzene, a polyaryl substituted benzene and an alkyl substituted naphthalene, the improvement of effecting said isomerization in a reaction mixture consisting essentially of an antecedently formed catalyst system comprising (1) a transition metal halide and (2) an organometallic compound of a non-transition metal, and the isomerizable material, said isomerization step being sequentially followed by the steps of decomposing the catalyst system and recovering the isomerized hydrocarbon.

9. In a process of isomerizing a polyalkyl substituted benzene, the improvement of effecting said isomerization in a reaction mixture consisting essentially of an antecedently formed catalyst system comprising (1) a transition metal halide and (2) an organometallic compound of a non-transition metal, and the isomerizable material, said isomerization step being sequentially followed by the steps of decomposing the catalyst system and recovering the isomerized hydrocarbon.

10. The process of claim 9 wherein the polyalkyl substituted benzene is a dimethyl substituted benzene.

11. In a process of isomerizing a member selected from the group consisting of polyalkylsubstituted benzene, a polyhalogen substituted benzene, a polyhalogenalkyl substituted benzene, a polyaryl substituted benzene and an alkyl substituted naphthalene, the improvement of effecting said isomerization in a reaction mixture consisting essentially of an antecedently formed catalyst system comprising the interaction product of (1) a trialkyl aluminum compound and (2) a titanium tetrahalide, and the isomerizable material, said isomerization step being sequentially followed by the steps of decomposing the catalyst system and recovering the isomerized hydrocarbon.

12. In a process of isomerizing a polyalkyl substituted benzene, the improvement of effecting said isomerization in a reaction mixture consisting essentially of an antecedently formed catalyst system comprising the interaction product (1) a trialkyl aluminum compound and (2) a titanium tetrahalide, and the isomerizable material, said isomerization step being sequentially followed by the steps of decomposing the catalyst system and recovering the isomerized hydrocarbon.

13. The process of claim 12 wherein the polyalkyl substituted benzene is a dimethyl substituted benzene.

14. In a process of isomerizing a member selected from the group consisting of polyalkyl substituted benzene, a polyhalogen substituted benzene, a polyhalogenalkyl substituted benzene, a polyaryl substituted benzene and an alkyl substituted naphthalene, the improvement of effecting said isomerization in a reaction mixture consisting essentially of an antecedently formed catalyst system comprising titanium trihalide, and the isomerizable material, said isomerization step being sequentially followed by the steps of decomposing the catalyst and recovering the isomerized hydrocarbon.

15. In a process of isomerizing a polyalkyl substituted benzene, the improvement of effecting said isomerization in a reaction mixture consisting essentially of an antecedently formed catalyst comprising a titanium trihalide, and the isomerizable material, said isomerization step being sequentially followed by the steps of decomposing the catalyst and recovering the isomerized hydrocarbon.

16. The process of claim 15, wherein the polyalkyl substituted benzene is a dimethyl substituted benzene.

17. In a process of isomerizing an isomerizable alkyl substituted hydrocarbon, the improvement of effecting said isomerization in a reaction mixture consisting essentially of an antecedently formed catalyst system comprising the interaction product of (1) a transition metal compound selected from the group consisting of halides, oxyhalides, chelates of beta-ketones, and alcoholates of said transition metal and (2) a non-transition metal compound selected from the group consisting of organometallic, organometallic halide, metal hydride, complex metallic hydrides, and complex organometallic hydrides of said non-transition metals, and the isomerizable material, said isomerization step being followed sequentially by the steps of decomposing the catalyst system and recovering the isomerized hydrocarbon.

References Cited in the file of this patent
UNITED STATES PATENTS

| 2,699,457 | Ziegler | Jan. 11, 1955 |
| 2,767,230 | Brown et al. | Oct. 16, 1956 |
| 2,898,327 | McCulloch et al. | Aug. 4, 1959 |
| 2,927,086 | Gordon et al. | Mar. 1, 1960 |
| 2,935,542 | Minckler et al. | May 3, 1960 |
| 2,951,045 | Gamble et al. | Aug. 30, 1960 |